United States Patent [19]

Brown et al.

[11] Patent Number: 4,966,545
[45] Date of Patent: Oct. 30, 1990

[54] STAGED SHOOTING POT FOR INJECTION MOLDING

[75] Inventors: Paul Brown, Orangeville; Vitaly Akselrud, Richmond Hill, both of Canada

[73] Assignee: Husky Injection Molding Systems Ltd., Bolton, Canada

[21] Appl. No.: 340,256

[22] Filed: Apr. 19, 1989

[51] Int. Cl.$^5$ .............................................. B29C 45/54
[52] U.S. Cl. ..................... 425/557; 425/558; 425/562; 425/572; 264/297.2; 264/328.8
[58] Field of Search .............. 264/297.2, 328.1, 328.7, 264/328.8, 328.13, 328.19; 425/145, 146, 149, 555, 557, 558, 562, 567, 572

[56] References Cited

U.S. PATENT DOCUMENTS

| 3,840,312 | 10/1974 | Paulson et al. | 425/149 |
| 4,525,134 | 6/1985 | McHenry et al. | 425/130 |
| 4,734,243 | 3/1988 | Kohama et al. | 264/328.14 |

FOREIGN PATENT DOCUMENTS

88/00117  1/1988  PCT Int'l Appl. ................ 425/130

Primary Examiner—Jill L. Heitbrink
Attorney, Agent, or Firm—Bachman & LaPointe, P.C.

[57] ABSTRACT

Injection molding apparatus and process characterized by feeding a supply of thermoplastic material to a shooting pot from a supply of thermoplastic material by a hot runner system, delivering a first charge of thermoplastic material from the shooting pot to a mold cavity, and delivering a second charge of thermoplastic material from the shooting pot to the mold cavity.

8 Claims, 3 Drawing Sheets

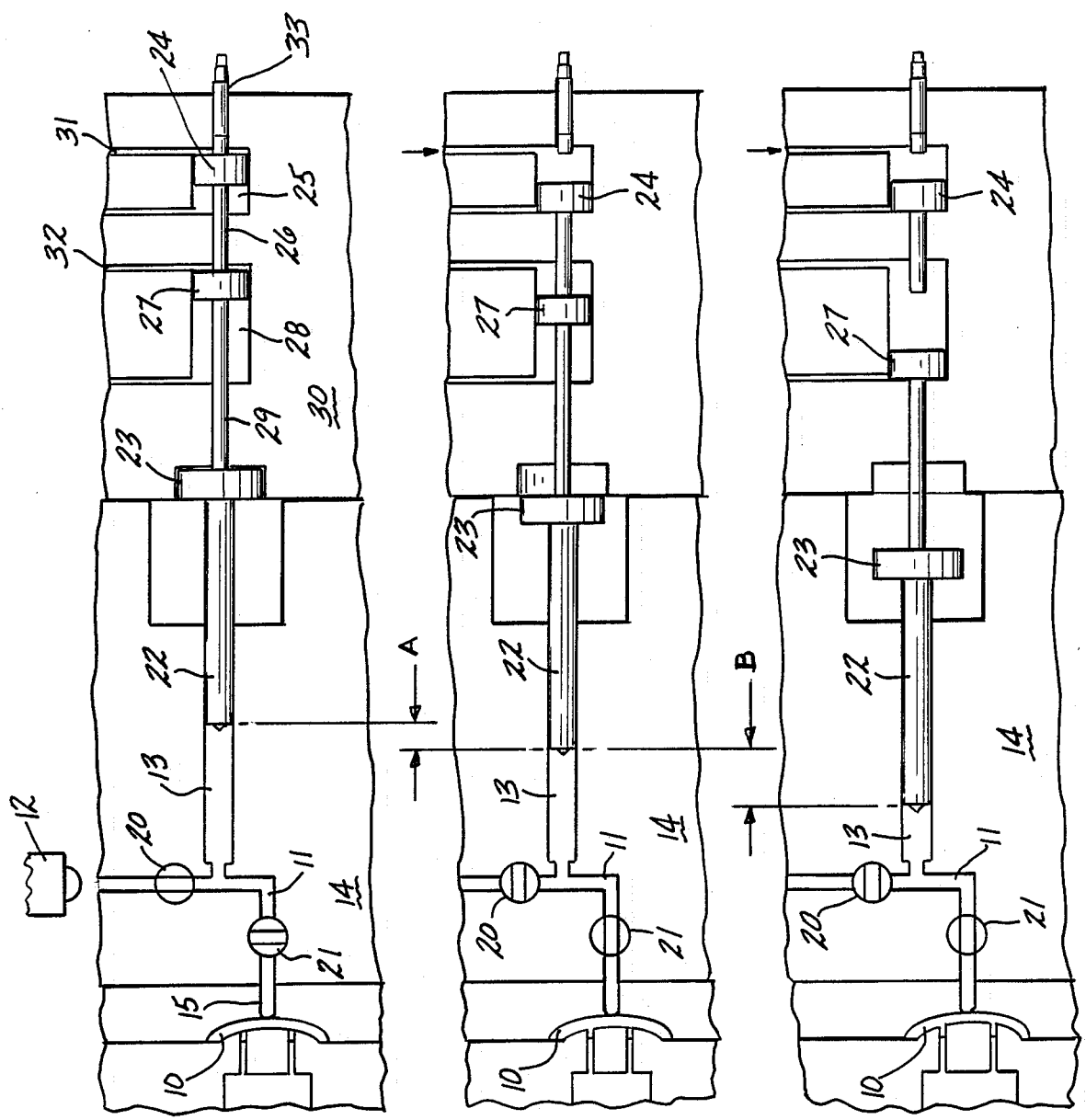

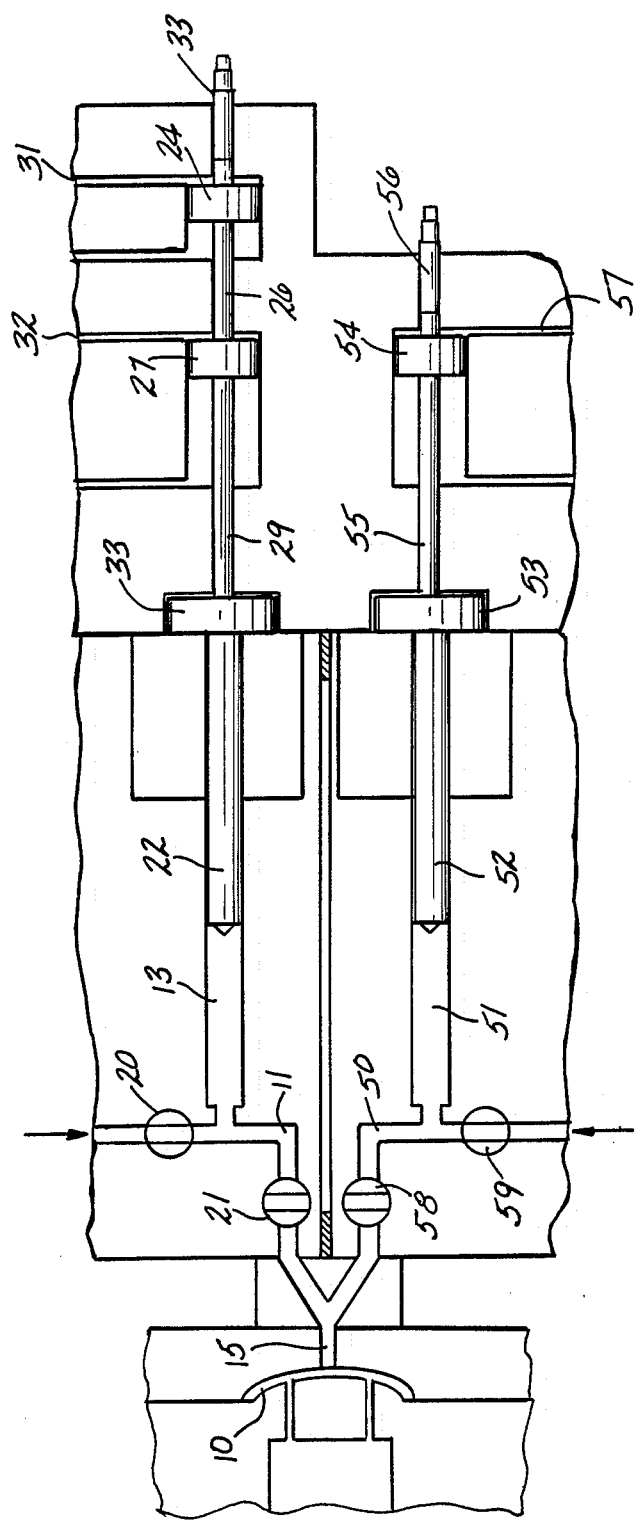

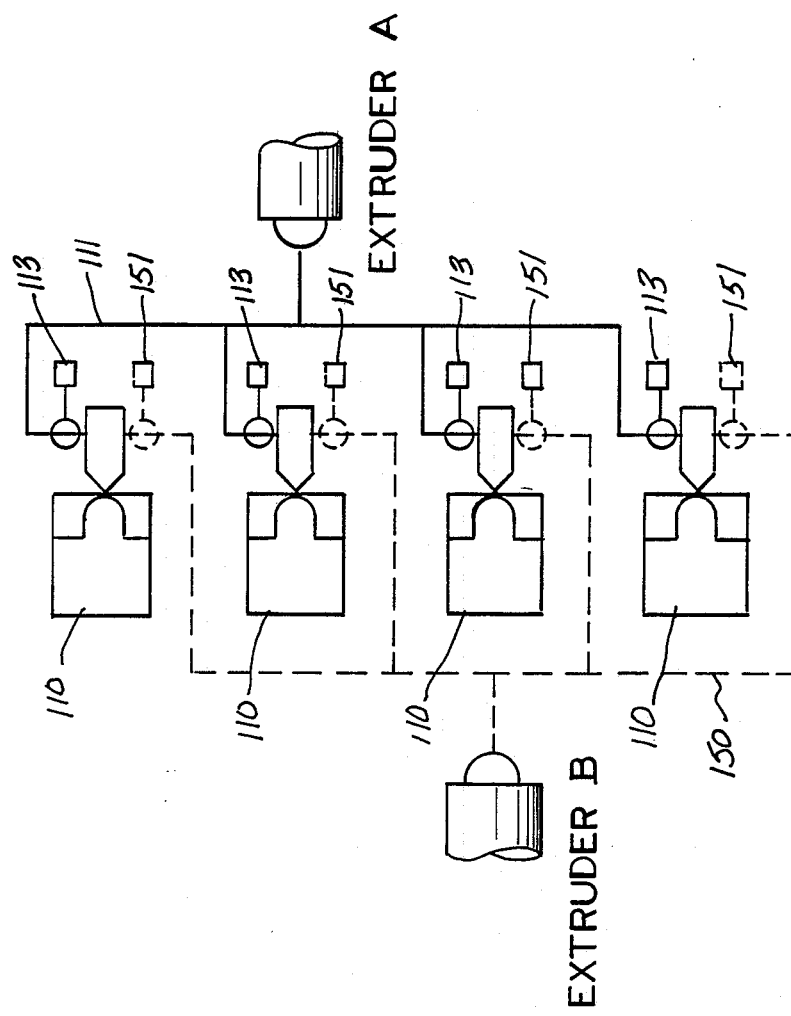

STAGED SHOOTING POT FOR INJECTION MOLDING

BACKGROUND OF THE INVENTION

The present invention relates to injection molding and particularly to the precise control or metering of thermoplastic material to one or more mold cavities.

The use of control units such as shooting pots to introduce thermoplastic resin into mold cavities in an injection molding system is well known. In such arrangements a primary resin source feeds the reservoir of a shooting pot and the shooting pot in turn is operated to feed a measured or metered quantity of thermoplastic material into the mold cavity.

It is also known to supply thermoplastic material to a multicavity mold where the cavities of the mold are fed by a hot runner system and where the hot runner system includes a plurality of shooting pots, with at least one each individual to each molding cavity. That is, a source of thermoplastic material leads to the hot runner system which in turn feeds the respective mold cavities wherein a shooting pot or metering means is provided for each mold cavity for controlling precisely the introduction of a shot of resin to the mold cavity. U.S. Pat. Nos. 4,717,324 and 4,775,308 teach the coinjection of a plurality of thermoplastic materials to mold an article having a layered wall structure using thermoplastic materials having different optimum processing temperatures including the maintenance of the optimum temperatures in flow paths individual to each material from its source to a mold cavity. These patents show shooting pots used in conjunction with the formation of the layered wall structure and multicavity molding. However, these disclosures involve the use of shooting pots to individually meter the amount of the first feeding of a first resin and the first feeding of a second resin into each cavity of a multicavity mold. In all cases, however, the final feeding and packing of the cavity is achieved by pressurizing the extruder or injection unit used to supply the final feeding resin to all the cavities in the mold. Thus, the hot runner supply channel system must be carefully balanced between the extruder or injection unit and each cavity gate or cavity orifice of the multicavity mold. In case of a large number of mold cavities, such as 32 or 48, this becomes quite impractical to achieve.

Accordingly, it is a principal object of the present invention to provide an injection molding method and apparatus for feeding a supply of thermoplastic material to a mold cavity from a shooting pot which can effectively eliminate the need for packing by the extruder or injection unit.

It is a further object of the present invention to provide a method and apparatus as aforesaid which is suitable for use with an injection molding apparatus including a large number of cavities.

Further objects and advantages of the present invention will appear hereinbelow.

SUMMARY OF THE INVENTION

In accordance with the present invention, the foregoing objects and advantages can be readily achieved.

The method of the present invention comprises a method for injection molding which comprises: feeding a supply of thermoplastic material to a shooting pot from a supply of thermoplastic material via a hot runner system; delivering a first charge of thermoplastic material from the shooting pot to a mold cavity; and delivering a second charge of thermoplastic material from the shooting pot to the mold cavity. The shooting pot maintains injection pressure or packing pressure on the mold cavity to pack or complete filling of the mold cavity and overcome shrinkage. Preferably also, a multicavity molding system is provided with a plurality of shooting pots, each individual to each mold cavity.

The injection molding apparatus of the present invention comprises: at least one mold cavity; a hot runner system for supplying thermoplastic material to said mold cavity; supply means for supplying said thermoplastic material to said hot runner system; a shooting pot operative to hold a given amount of thermoplastic material communicating with the hot runner system and supplied thereby; a first valve means between the supply means and the shooting pot, generally in the hot runner system, and a second valve means between the shooting pot and the mold cavity, both of said valve means being operative to permit and block flow of thermoplastic material; a first injection means communicating with said shooting pot for delivery of a first charge of thermoplastic material from said shooting pot to said mold cavity; and a second injection means communicating with said shooting pot for delivery of a second charge of thermoplastic material from the shooting pot to the mold cavity. The second injection means is provided with means for maintaining a supply of thermoplastic material from the shooting pot to the mold cavity in order to pack or fill the mold cavity and overcome shrinkage of thermoplastic material.

In the preferred embodiment, a second hot runner system is provided for supplying a second thermoplastic material to the mold cavity, second supply means for supplying said second thermoplastic material to said second hot runner system, a second shooting pot operative to hold a given amount of the second thermoplastic material communicating with the second hot runner system and supplied thereby, a third and fourth valve means operative to permit and block flow of thermoplastic material, and a third injection means communicating with the second shooting pot for delivering a charge of the second thermoplastic material to the mold cavity.

Preferably also a plurality of mold cavities are provided with one or more shooting pots individual to each mold cavity.

Thus, in accordance with the present invention, it is not necessary for the supply means or extruder to make the final feeding. The final feeding of thermoplastic material to each mold cavity can be achieved by a shooting pot, e.g., the same shooting pot that made the first feeding. This obviates the need to provide a balanced hot runner system between the machine's extruder or injection unit and each cavity. Consequently, a simpler design is provided and complicated hot runner construction is eliminated. Moreover, in accordance with the present invention, it now becomes practical to construct multicavity molds exceeding 24 cavities.

Further objects and advantages of the present invention will appear hereinbelow.

BRIEF DESCRIPTION OF THE DRAWINGS

The present invention will be more readily understandable from a consideration of the appended drawings wherein:

FIG. 1 is a schematic drawing showing the injection system of the present invention fully charged with a resin;

FIG. 2 is similar to FIG. 1 showing the first stage injection having been completed;

FIG. 3 is similar to FIG. 1 showing the second stage injection having been completed;

FIG. 4 shows a two stage shooting pot in combination with a single stage shooting pot for supplying at least two different resins to the same cavity; and FIG. 5 is a schematic illustration of the system and method of the present invention for a four cavity mold accommodating two thermoplastic resins with each mold utilizing the system of FIG. 4.

DETAILED DESCRIPTION

FIGS. 1-3 show a representative embodiment of the present invention. For ease of understanding FIGS. 1-3 show a single mold cavity; however, it should be appreciated that a plurality of mold cavities may be fed by a single extruder with each mold cavity including at least one shooting pot associated therewith. FIG. 1 shows the injection system fully charged, FIG. 2 shows the first stage injection completed, and FIG. 3 shows the second stage injection completed. Referring to FIG. 1, mold cavity 10 is supplied with thermoplastic material via hot runner system 11, leading from a source or supply means of thermoplastic material, such as extruder 12. Shooting pot or injection cylinder 13 communicates with hot runner system 11 and is supplied thereby. Both the shooting pot 13 and hot runner system 11 are located in manifold 14 which may be provided with appropriate heating means to maintain the resin in the hot runner system and in the shooting pot at an appropriate temperature, all in a customary manner. Injection nozzle 15 is provided leading from hot runner system 11 and communicating with mold cavity 10, also in a customary manner, including customary valve gate (not shown).

A first valve means 20 is provided in hot runner system 11 between shooting pot 13 and supply means 12, and a second valve means 21 is provided in hot runner system 11 between mold cavity 10 and shooting pot 13, both of said valve means being operative to permit and block flow of thermoplastic material in the hot runner system. FIG. 1 shows the first valve means 20 open to permit flow of resin from extruder 12 to shooting pot 13, and the second valve means closed to prevent flow of resin to the mold cavity 10.

Shooting pot 13 is filled from supply means 12 via hot runner system 11 with valve 20 open and valve 21 closed as shown in FIG. 1. In the filled condition the shooting pot contains a volume equal to $V_1$ and $V_2$ which is equivalent to the first charge of resin to the mold cavity ($V_1$) plus the second charge of resin to the mold cavity ($V_2$). The shooting pot can be discharged to supply resin to the mold cavity via hot runner system 11 with first valve means 20 closed to block back-flow of resin and second valve means 21 open, as shown in FIGS. 2 and 3. Thus, as shown for example in FIG. 2, first valve means 20 is closed to block flow of resin to the supply means and second valve means 21 is open to permit flow of resin to mold cavity 10.

Shooting pot 13 includes injection piston 22 actuated by injection pad 23. A first stage injection piston 24 situated in first injection cavity 25 in machine platen 30 (or alternately in mold base) operates first injection rod 26, which in turn actuates a second stage injection piston 27 situated in second injection cavity 28. The second stage piston 27 operates a second injection rod 29 which in turn actuates pad 23. In the fully charged position shown in FIG. 1, piston 22, pad 23 and pistons 24 and 27 are in the fully retracted position.

A high pressure fluid is supplied to one side of first stage injection piston 24 via supply line 31 from a suitable pressure source (not shown) to advance piston 24 and rod 26. Rod 26 pushes against second stage piston 27 and rod 29 which in turn pushes against pad 23. Piston 24 advances until it bottoms out at the end of its stroke against cylinder end of cavity 25. The shooting pot piston 22 has advanced a distance A and displaced a corresponding volume of resin $V_1$ into mold cavity 10 with the apparatus now in the position shown in FIG. 2.

As shown in FIG. 3, the second stage injection takes place after the first stage injection when a high pressure fluid is supplied to one side of second stage injection piston 27 via supply line 32 from a suitable pressure source (not shown) to further advance piston 27. Piston 27 in turn further advances rod 29 which in turn advances pad 23 and rod 22 to displace a corresponding volume of resin $V_2$ into mold cavity 10 via nozzle 15. Unlike the first stage, however, piston 27 does not bottom out at the cylinder end of cavity 28, but continues to maintain hold pressure against the piston to continue to pressurize the resin and to continue to supply more resin to the mold cavity during the hold stage or packing stage of the cycle. As the resin in the mold cavity shrinks more resin is supplied thereto from the shooting pot via pressure maintained on piston 27 to make up the shrinkage until the cycle is complete and the shooting pot piston has advanced a final distance B. Piston 27 may then bottom out against cylinder end of cavity 28 as shown in FIG. 3.

When the injection and hold stages of the cycle are complete valve means 21 is closed and valve means 20 is opened and the shooting pot is recharged with resin. The incoming resin pushes back the shooting pot piston 22, pad 23 and associated first and second stage pistons until the first stage piston 24 contacts volume adjusting means 33 which adjusts the stroke of the first and second injection means and the volume charged in the shooting pot. This is shown in FIG. 1-3 as an adjustable threaded rod against which first piston 24 contacts; however, any suitable means to adjust the volume of the resin delivered in the first and second injection steps may be employed. Thus, a present volume of resin is charged in the shooting pot because of the preset stroke of piston 24 and associated back position of piston 27. Hence, preset volume $V_1$ (first shot) can be discharged and a second volume $V_2$ can be discharged (second shot) to fill and pack out the part in the mold cavity.

The molded part is ejected from the mold cavity and the cycle is repeated.

A particular application of the present invention is in the coinjection of multilayered articles, such as for example preforms. FIG. 4 shows a preferred embodiment, wherein it should be appreciated that a plurality of mold cavities may be employed, with each mold cavity having two or more shooting pots associated therewith and with the entire system fed by at least two extruders (one for each resin).

FIG. 4 shows a mold hot runner system having two sets of shooting pots and associated pistons for moving them. The first resin system utilizes a system as shown in FIGS. 1-3 with like reference numerals employed for like components. The second resin system utilizes hot runner system 50 communicating with a supply of second resin as from a suitable extruder and communicating with mold cavity 10 via nozzle 15. Second shooting pot 51 operative to hold a given amount of second resin communicates with hot runner system 50 and is supplied thereby. Third and fourth valve means 58 and 59 are provided on hot runner system 50 operative to permit and block flow of the second thermoplastic material in the same manner as first and second valve means 20 and 21. Second shooting pot 51 is operated by injection piston 52 actuated by injection pad 53 which in turn is actuated by piston 54 and rod 55. Volume adjusting means 56 is provided associated with piston 54 similar to volume adjusting means 33. High pressure fluid is supplied to one side of piston 54 via supply line 57 from a suitable pressure source (not shown).

Thus, in operation, the shooting pots are charged with resin by closing valve means 21 and 58 and opening valve means 20 and 59 as shown in FIG. 4 with the system fully charged. Valve means 20 and 52 are then closed to block the supply channels to the shooting pots. Valve means 21 is opened. High pressure fluid is supplied to first shot piston 24 to displace first volume $V_1$ of first resin into mold cavity 10 via channel 11 and nozzle 15.

Valve means 21 is then closed, valve means 53 opened and high pressure fluid is supplied to piston 54 for a first shot of a second resin to advance piston 54 and its associated shooting pot piston 52 to displace a preset volume $V_2$ of resin into mold cavity 10 via channel 50 and nozzle 15.

Valve means 53 is then closed and valve means 21 opened again. High pressure fluid is supplied to third shot piston 27 to displace its shooting pot piston 22 for a second feeding of the first resin into mold cavity 10 via channel 11 and nozzle 15 until the mold cavity is filled. Piston 27 maintains hold pressure to fill and pack mold cavity 10 as in FIGS. 1-3.

Valve means 21 is then closed and valve means 20 and 52 opened to recharge both shooting pots at the same time for the next cycle, the molded part is removed and the cycle repeated.

The sequence described above with respect to FIG. 4 is for sequential injection of three feedings of two resins which will form a five layered wall structure in the molded part. The final feeding of the first resin includes the packing or holding step to fill the mold and compensate for shrinkage.

As indicated hereinabove, the present invention is particularly suitable to simultaneous molding of a plurality of parts, such as for example 16, 24, 32 or 48 parts. This is shown schematically in FIG. 5 for four parts using two resins in a manner similar to FIG. 4. In FIG. 5, extruder A feeds the first resin shown in solid lines and extruder B feeds the second resin shown in dashed lines. Molds 110 are fed by hot runner systems 111 and 150 similar to hot runner systems 11 and 50 respectively. Shooting pots 113 and 151 are provided similar to shooting pots 13 and 51 in FIG. 4. Thus, each mold cavity 110 has an associated first shooting pot 113 for the first resin and associated second shooting pot 151 for the second resin. Appropriate valve means are provided in the hot runner systems in a manner after FIG. 4. Thus, it can be readily seen that a plurality of mold cavities may be fed from a single extruder for each resin with one or more shooting pots associated with each mold cavity for feeding resin to the mold cavity including filling and packing thereof by the shooting pots.

It can be readily seen that the method and apparatus of the present invention achieves significant advantages. The shooting pot system achieves a staggered injection cycle including a metered first charge followed by a second charge from the same source individual to each mold cavity. This provides a balanced hot runner system between the machine's extruder or injection unit and each cavity and avoids the considerable complications heretofore involved in constructing large multi-cavity systems. The present invention is admirably suitable to co-injection and tri-injection molding in multi-cavity molds obviating complexities of construction and achieving simplified operating systems. Moreover, in view of the fact that all feeding to the mold cavity is handled by the shooting pots, it becomes simpler to control the temperature of each resin individually. This is a highly desirable goal and it is achieved readily and conveniently by the instant system.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An injection molding apparatus which comprises: at least one mold cavity; a hot runner system for supplying thermoplastic material to said mold cavity; supply means for supplying thermoplastic material to the hot runner system; a shooting pot operative to hold a given amount of thermoplastic material communicating with the hot runner system and supplied thereby; a first valve means between the supply means and the shooting pot and a second valve means between the shooting pot and the mold cavity, both of said valve means being operative to permit and block flow of thermoplastic material; a first injection means communicating with said shooting pot for delivering a first charge of thermoplastic material from the shooting pot to the mold cavity; said first injection means including a first stage injection piston situated in a first stage injection cavity; a second injection means communicating with said shooting pot for delivering a second charge of thermoplastic material from the shooting pot to the mold cavity; said second injection means including a second stage injection piston situated in a second stage injection cavity; and including a first stage actuating means of said first stage injection means which contacts and actuates the second stage injection piston for delivery of the first charge of thermoplastic material.

2. An apparatus according to claim 1 wherein said second injection means includes means for maintaining a supply of thermoplastic material from said shooting pot to said mold cavity to fill the mold cavity and overcome shrinkage of thermoplastic material.

3. An apparatus according to claim 1 including a plurality of mold cavities each of which having an associated shooting pot.

4. An apparatus according to claim 1 wherein each mold cavity includes a second hot runner system for supplying a second thermoplastic material to the mold cavity, second supply means for supplying the second thermoplastic material to the second hot runner system, a second shooting pot operative to hold a given amount of the second thermoplastic material communicating with the second hot runner system and supplied thereby, a third valve means between the second supply means and second shooting pot and a fourth valve means between the second shooting pot and the mold cavity, both of said valve means operative to permit and block flow of thermoplastic material, a third injection means communicating with said second shooting pot for delivery of a measured charge of second thermoplastic material to the mold cavity.

5. An apparatus according to claim 1 including a hot runner manifold wherein said shooting pot is within the hot runner manifold.

6. An apparatus to claim 1 including volume adjusting means associated with the first injection means to adjust the volume of resin in the shooting pot.

7. An apparatus according to claim 1 including a second stage actuating means of said second stage injection means communicating with said shooting pot for delivery of the second charge of thermoplastic material from the shooting pot to the mold cavity at the end of the stroke of the first stage injection piston.

8. An apparatus according to claim 1 including separate pressure supply lines for supplying pressure separately to the first and second stage injection pistons.

* * * * *